United States Patent [19]
Dimroth et al.

[11] 4,083,686
[45] Apr. 11, 1978

[54] UNIFORMLY DYED WATER-SWELLABLE CELLULOSIC FIBERS

[75] Inventors: Peter Dimroth, Mannheim; Walter Kurtz, Bad Durkheim; Volker Radtke, Hassloch; Werner Juenemann, Ludwigshafen, all of Germany

[73] Assignee: BASF Aktiengesellschaft, Ludwigshafen, Germany

[21] Appl. No.: 772,768

[22] Filed: Feb. 28, 1977

[30] Foreign Application Priority Data

Mar. 18, 1976 Austria .................. 2024/76

[51] Int. Cl.$^2$ ............... C09B 27/00; C09B 67/00
[52] U.S. Cl. ........................ 8/41 R; 8/21 C; 8/39 R; 8/54.2; 8/93; 260/152
[58] Field of Search .............. 8/41 R, 93, 39 R, 54.2, 8/21 C

[56] References Cited

U.S. PATENT DOCUMENTS

| | | | |
|---|---|---|---|
| 3,706,525 | 12/1972 | Blackwell et al. | 8/21 C |
| 3,707,348 | 12/1972 | Blackwell et al. | 8/21 C |
| 3,888,624 | 6/1975 | Blackwell et al. | 8/21 C |
| 4,049,377 | 9/1977 | Schwabe | 8/169 |

FOREIGN PATENT DOCUMENTS 1,933,119  1/1970  Germany.
1,231,367  12/1966  Germany.

*Primary Examiner*—A. Lionel Clingman
*Attorney, Agent, or Firm*—Keil, Thompson & Shurtleff

[57] ABSTRACT

Uniformly dyed water-swellable cellulosic fibers obtained by dyeing cellulosic fibers, in the swollen state, with a dye of the formula

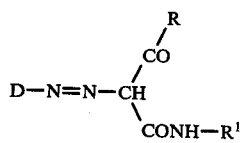

where D is a radical of a diazo component of the aniline, aminoazobenzene, aminophthalimide, aminonaphthalimide, anthraquinone or benzanthrone series, R is alkyl of 1 to 4 carbon atoms or phenyl which is unsubstituted or substituted by chlorine, bromine, methyl, methoxy or ethoxy and $R^1$ is phenyl which is unsubstituted or substituted by chlorine, bromine, methyl, ethyl, methoxy, ethoxy, benzyloxy, phenoxy, chlorophenoxy, unsubstituted or N-substituted carbamoyl or sulfamoyl, unsubstituted or N-substituted phthalimidyl, alkoxycarbonyl of 1 to 8 carbon atoms, cyano or phenylsulfonyl.

13 Claims, No Drawings

UNIFORMLY DYED WATER-SWELLABLE CELLULOSIC FIBERS

The invention relates to uniformly dyed water-swellable cellulosic fibers, said fibers being fast to washing, dry cleaning, sublimation and light and being produced by contacting water-swellable cellulosic fibers successively or simultaneously with water, ethylene glycol or a derivative of ethylene glycol and, while the fibers are still swollen, with an essentially water-insoluble dye of the formula

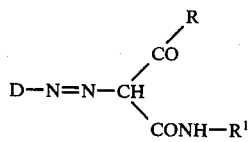   I where D is a radical of a diazo component of the aniline, aminoazobenzene, aminophthalimide, aminonaphthalimide, anthraquinone or benzanthrone series, R is alkyl of 1 to 4 carbon atoms or phenyl which is unsubstituted or substituted by chlorine, bromine, methyl, methoxy or ethoxy and $R^1$ is phenyl which is unsubstituted or substituted by chlorine, bromine, methyl, ethyl, methoxy, ethoxy, benzyloxy, phenoxy, chlorophenoxy, unsubstituted or N-substituted carbamoyl or sulfamoyl, unsubstituted or N-substituted phthalimidyl, alkoxycarbonyl of 1 to 8 carbon atoms, cyano or phenylsulfonyl.

The radicals D of the diazo componennt may be substituted; examples of suitable substituents are, in the aniline series, fluorine, chlorine, bromine, methyl, trifluoromethyl, ethyl, methoxy, ethoxy, phenoxy, nitro, cyano, methylsulfonyl, ethylsulfonyl, phenylsulfonyl, alkoxycarbonyl of 1 to 8 carbon atoms, acetylamino, benzoyl, unsubstituted or N-substituted carbamoyl or sulfamoyl, oxdiazolyl or phenyloxdiazolyl; in the aminoazobenzene series, chlorine, bromine, nitro, methyl, ethyl, methoxy or ethoxy; in the aminophthalimide and aminonaphthalimide series, chlorine, methyl, cyano and — at the imide nitrogen — alkyl of 1 to 8 carbon atoms, alkyl of 2 or 3 carbon atoms substituted by alkoxy of 1 to 8 carbon atoms, phenoxyalkyl, phenylalkyl or unsubstituted or substituted phenyl, the alkyl radicals being uninterrupted or interrupted by oxygen; in the anthraquinone and benzanthrone series, chlorine or bromine.

Examples of alkyl radicals R are butyl, propyl, ethyl and preferably methyl.

Examples of N-substituted carbamoyl or sulfamoyl radicals, and of alkoxycarbonyl radicals of 1 to 8 carbon atoms, which $R^1$ may represent and the aniline radicals D may contain are: $CONHCH_3$, $CONHC_2H_5$, $CONHC_3H_7$, $CONHC_4H_9$, $CONHC_6H_{13}$,

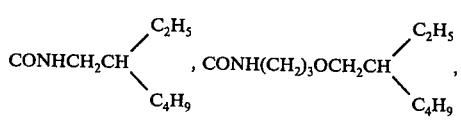

$CONH(CH_2)_3OC_2H_4OC_2H_4OC_6H_5$, $CONHC_2H_4OH$, $CONHC_3H_7OCH_3$, $CON(CH_3)_2$, $CON(C_2H_5)_2$, $CON(C_4H_9)_2$,

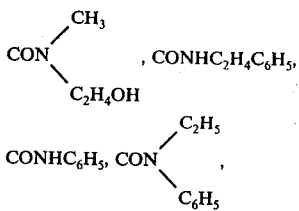

the corresponding sulfamoyl groups, and $COOCH_3$, $COOC_2H_5$, $COOC_3H_7$, $COOC_4H_9$, $COOC_6H_{13}$,

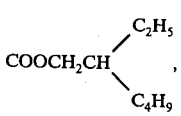

$COOC_2H_4OH$, $COOC_2H_4OCH_3$, $COOC_2H_4OC_2H_5$ and $COOC_2H_4OC_4H_9$.

Unsubstituted or N-substituted phthalimidyl radicals are radicals bonded in the 3-position or 4-position, which may be substituted, at the nitrogen, by, for example, alkyl of 1 to 8 carbon atoms, alkyl of 2 or 3 carbon atoms substituted by alkoxy of 1 to 8 carbon atoms, phenylethyl or phenoxyethoxypropyl.

In additon to those already mentioned, specific examples of N-substituents are: $CH_3$, $C_2H_5$, n- or i-$C_3H_7$, n- or i-$C_4H_9$, $C_5H_{11}$, $C_6H_{13}$, $C_8H_{17}$,

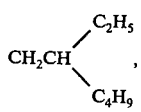

$(CH_2)_3OCH_3$, $(CH_2)_3OC_2H_5$, $(CH_2)_3OC_3H_7$, $(CH_2)_3OC_4H_9$,

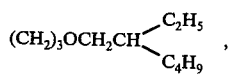

$C_2H_4OCH_3$, $C_2H_4OC_2H_5$, $C_2H_4OC_4H_9$, $(CH_2)_3OC_2H_4OCH_3$, $(CH_2)_3OC_2H_4OC_2H_5$ and $(CH_2)_3OC_2H_4OC_4H_9$.

Preferred carbamoyl, sulfamoyl and phthalimidyl radicals are those substituents which contain phenyl groups, especially $CONHC_2H_4C_6H_5$, $CONHC_6H_5$, $CONH(CH_2)_3OC_2H_4OC_6H_5$,

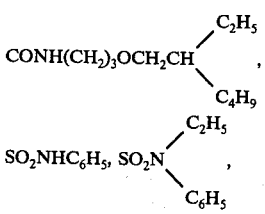

$SO_2NHC_2H_4C_6H_5$, $SO_2NH(CH_2)_3OC_2H_4OC_6H_5$ or

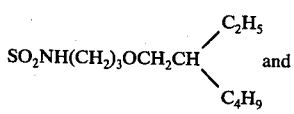

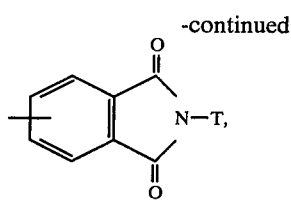

where T is $C_6H_5$, $C_2H_4C_6H_5$, $(CH_2)_3OC_2H_4OC_6H_5$ or

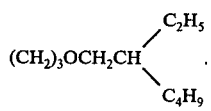

The invention relates in particular to fibers which have been dyed with dyes of the formula I in which D is phenyl substituted by fluorine, chlorine, bromine, methyl, trifluoromethyl, ethyl, methoxy, ethoxy, phenoxy, nitro, cyano, methylsulfonyl, ethylsulfonyl, phenylsulfonyl, alkoxycarbonyl of 1 to 8 carbon atoms, acetylamino, benzoyl, carbamoyl or sulfamoyl which are N-substituted by alkyl of 1 to 8 carbon atoms, by phenyl or by phenyl which is substituted by chlorine, methyl or methoxy, oxdiazol-5-yl, 3-phenyloxdiazol-5-yl, 4-phenyloxdiazol-2-yl, phenylazo, phenylazo substituted by chlorine, bromine, nitro, methyl, ethyl, methoxy or ethoxy, $CONH(CH_2)_3OC_2H_4OT^1$ or $SO_2NH(CH_2)_3OC_2H_4OT^1$;

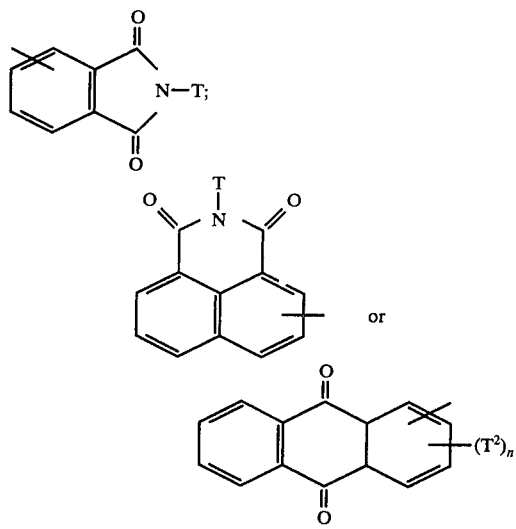

where $n$ is 0 or 1, T is $C_6H_5$, $C_2H_4C_6H_5$, $(CH_2)_3OC_2H_4OC_6H_5$ or

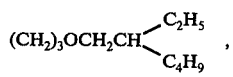

$T^1$ is alkyl of 1 to 8 carbon atoms, benzyl, phenylethyl, cyclohexyl, phenyl or tolyl, $T^2$ is methyl, chlorine or bromine, R is alkyl of 1 to 4 carbon atoms, phenyl or phenyl substituted by chlorine, bromine, methyl, methoxy or ethoxy, and $R^1$ is phenyl, or phenyl substituted by chlorine, bromine, methyl, ethyl, methoxy, ethoxy, benzyloxy, phenoxy, chlorophenoxy, alkoxycarbonyl (where alkoxy is of 1 to 8 carbon atoms), cyano, phenylsulfonyl, $CONHT^3$ or $SO_2NHT^3$, or

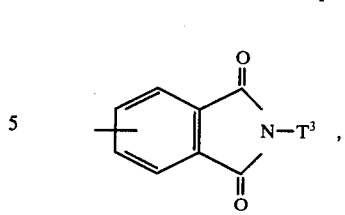

where $T^3$ is alkyl of 1 to 8 carbon atoms, cyclohexyl, benzyl, phenylethyl, phenyl, phenyl substituted by chlorine, methyl, methoxy or ethoxy, or $(CH_2)_3OC_2H_4OT^1$.

Specific examples of diazo components are: o-, m- or p-nitroaniline, o-, m- or p-cyanoaniline, 2,5-dichloroaniline, 2,4,5-trichloroaniline, 2-chloro-4-nitroaniline, 2-bromo-4-nitroaniline, 2-cyano-4nitroaniline, 1-amino-4-methyl-2-nitrobenzene, 1-amino-4-methoxy-2-nitrobenzene, 1-amino-4-chloro- or -bromo-2-nitrobenzene, 1-amino-2-methyl-4-nitrobenzene, 1-amino-2-trifluoromethyl-4-chlorobenzene, 1-amino-2methoxy-4-nitrobenzene, 2-amino-4-chlorobenzophenone, 4-amino-acetophenone, 4-aminobenzophenone, 2-aminobenzophenone, 2-amino-diphenylsulfone, 2-, 3- or 4-aminobenzoic acid methyl ester, ethyl ester, propyl ester, butyl ester, isobutyl ester, β-ethylhexyl ester, β-methoxyethyl ester, β-ethoxyethyl ester and methyldiglycol ester, 4-nitroanthranilic acid methyl ester, isobutyl ester, methyldiglycol ester and β-methoxyethyl ester, aminoterephthalic acid dimethyl ester and diethyl ester, 4-aminobenzoic acid amide, methylamide, propylamide, n-butylamide, cyclohexylamide and methoxypropylamide, 2-, 3- or 4-aminobenzoic acid dimethylamide, pyrrolidide and morpholide, 5-aminoisophthalic acid diamide and dimethoxypropylamide, 3- or 4-aminophthalimide, -β-hydroxyethylimide, -γ-hydroxypropylimide, -phenylimide and -tolylimide, 3-amino-6-nitrophthalic acid β-hydroxyethylimide, 2,4-dinitro-6-bromoaniline, 2,5-dichloro-4-nitroaniline, 2-chloro-4-aminobenzonitrile, 2-amino-4-chlorobenzonitrile, 4-amino-naphthalic cid 1,8-methoxyethylimide and methoxypropylimide, 1-amino-4-nitrobenzene-2-methylsulfone, 2,4-dinitroaniline, 1-amino-2nitrobenzene-4-sulfonamide, 1-amino-2-nitrobenzene-4-sulfonic acid n-butylamide, 1-amino-2-nitrobenzene-4-sulfonic acid β-methoxyethylamide, 1-aminoanthraquinone, 1-amino-4-chloroanthraquinone, 4-aminonaphthalic acid butylimide,

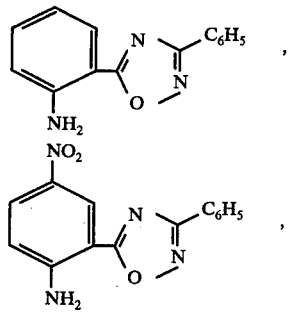

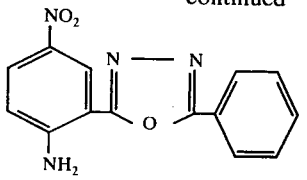

4-aminoazobenzene, 2',3-dimethyl-4-aminoazobenzene, 3,2-dimethyl-4-aminoazobenzene, 2,5-dimethyl-4-aminoazobenzene, 2-methyl-5-methoxy-4-aminoazobenzene, 2,5-dimethoxy-4-aminoazobenzene, 4'-nitro-2,5-dimethoxy-4-aminoazobenzene, 4'-nitro-4-aminoazobenzene, 4'-nitro-2-methyl-5-methoxy-4-aminoazobenzene and 4'-chloro-2-methyl-4-aminoazobenzene.

Examples of preferred diazo components are α-aminoanthraquinone, 4-aminoazobenzene, 2,2'-dimethyl-4-aminoazobenzene,

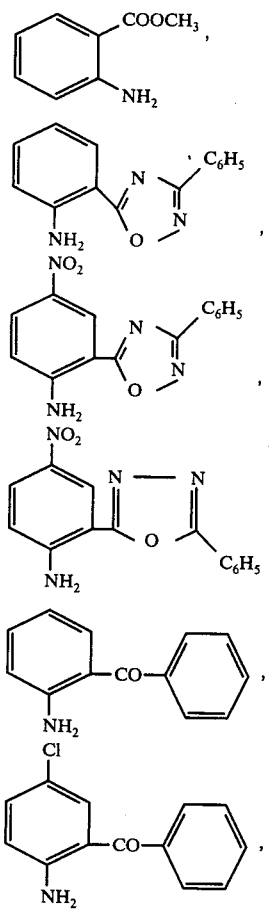

o-nitroaniline, 4-chloro-o-nitroaniline and 4-methyl-o-nitroaniline.

To manufacture the dyes of the formula I, a diazo compound of an amine of the formula II

D—NH$_2$      II may be reacted with coupling components of the formula III

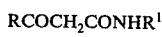

RCOCH$_2$CONHR$^1$     III by conventional methods. Some of the dyes of the formula I are already known.

Dyes of the formula Ia

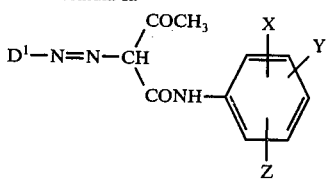

where $D^1$ is a radical of the aniline or anthraquinone series, X is hydrogen, chlorine, methyl, ethyl, methoxy, ethoxy, phenoxy, chlorophenoxy, methoxycarbonyl, ethoxycarbonyl or ethoxyethoxycarbonyl, Y is hydrogen, chlorine, methyl, ethyl, methoxy or ethoxy and Z is hydrogen, methyl, methoxy, N-substituted carbamoyl, sulfamoyl or 3- or 4-phthalimidyl, are particularly valuable for dyeing the fibers according to the invention.

In particular, $D^1$ in these compounds is the radical of one of the preferred diazo components listed above.

From the point of view of their structure, the dyes of the formula I can be described as substantially insoluble disperse dyes which as a rule cannot be applied to, for example, cotton. However, U.S. Pat. No. 3,706,525 discloses a process which permits such dyes to be printed onto cellulose and cellulosic textiles. The general sense of the data on process conditions, given in the said patent, also applies to dyeing with the dyes of the formula I. In addition, U.S. patent application Ser. No. 691,496 describes further processes by means of which the fibers of the invention may be obtained. Of these, printing processes are preferred. In addition to cellulosic fibers, mixtures of cellulosic fibers and synthetic fibers, in particular cotton and polyester, may also be dyed and printed.

The fibers of the invention which are obtained have excellent fastness properties, amongst which wet fastness and in some cases also light fastness may be mentioned. For example, in the case of prints, no staining of any white ground occurs on laundering.

For dyeing and printing purposes, the dyes of the formula I are advantageously converted to dye formulations which in addition to the above dyes contain dispersing agents, water retention agents and water, with or without other constituents conventionally used in dye formulations, eg. disinfectants or foam suppressants. Examples of suitable dispersing agents are anionic compounds, ie. dispersing agents which are also conventionally used for other disperse dyes. Specific examples are condensation products of phenol, formaldehyde and sodium sulfite, sulfomethylation products as a general category, and ligninsulfonates. Water retention agents are, in particular, glycols and glycol ethers, eg. ethylene glycol and ethylene diglycol.

In the Examples which follow, parts and percentages are by weight, unless stated otherwise.

EXAMPLE 1

A cotton fabric is printed, by rotary screen printing, with an ink which comprises 10 parts of the dye of the formula

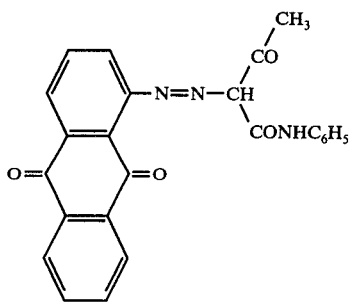

100 parts of polyethylene oxide of molecular weight 300 and 790 parts of a 3% strength alginate thickener, and the print is dried at 100° C. It is then treated for 1 minute with hot air at 200° C, rinsed cold, soaped at the boil, again rinsed cold, and dried. A light-fast and wash-fast yellow print on a white ground is obtained.

EXAMPLE 2

A polyester/cotton union fabric (weight ratio 67:33) is printed with a paste comprising 20 parts of the dye of the formula

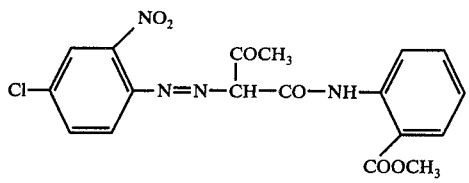

120 parts of the reaction product of polyethylene oxide of molecular weight 300 with boric acid in the molar ratio of 3:1 and 860 parts of a 10% strength alginate thickener. The print is dried at 105° C and treated with live steam for 6 minutes at 180° C. It is then rinsed with cold water, soaped at 80° C, rinsed cold and dried.

A light-fast and wash-fast greenish-yellow print on a white ground is obtained.

EXAMPLE 3

A cotton fabric is roller-printed with a print paste which comprises 15 parts of the dye of the formula

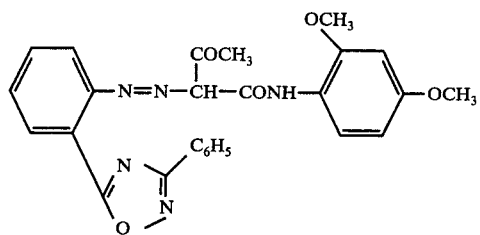

110 parts of polyethylene oxide of molecular weight 350, 30 parts of oleic acid diethanolamide and 845 parts of a 10% strength alginate thickener. The print is dried at 100° C and is then fixed by treating it with hot air for 1 minute at 195° C. It is finished as described in Example 1 and a fast, greenish-yellow print on a white ground is obtained.

EXAMPLE 4

A polyester/cellulose union fabric (weight ratio 67:33) is printed on a screen printing machine with an ink which comprises 30 parts of the dye of the formula

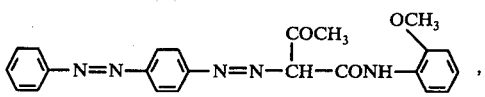

100 parts of the reaction product of polyethylene oxide of molecular weight 300 with boric acid in the molar ratio of 3:1, 30 parts of oleic acid diethanolamide and 840 parts of a 3% strength alginate thickener, and the print is dried at 110° C. It is then treated for 5 minutes with live steam at 185° C, and finished as described in Example 2.

A fast reddish-yellow print on a white ground is obtained.

EXAMPLE 5

A cotton fabric is treated on a padder with a solution which contains 20 parts of the dye of the formula

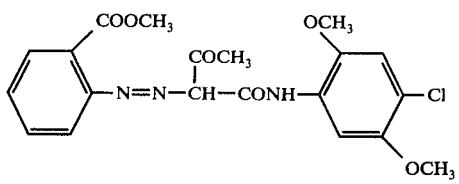

300 parts of a 3% strength alginate thickener, 550 parts of water and 130 parts of polyethylene oxide of molecular weight 300. the liquor pick-up is 80%. The fabric is dried at 100° C and then treated for 5 minutes with live steam at 190° C to fix the dye. Thereafter it is rinsed cold and washed at 90° C in a liquor which contains 3 parts of the condensation product of a long-chain alcohol with ethylene oxide per 997 parts of water.

A yellow dyeing results.

Instead of a cotton fabric, a polyester/cotton fabric (weight ratio 67:33) can be padded with the above solution. A yellow dyeing is obtained, with both constituents exhibiting the same shade. Fixing with hot air for 2 minutes at 195° C may be substituted for the treatment with live steam.

EXAMPLE 6

A cotton fabric is treated on a padder with a solution of 150 parts of polyethylene oxide in 850 parts of water, so as to give a liquor pick-up of 80%, and the padded fabric is dried at 100° C. The fabric is then printed, by rotary screen printing, with an ink which comprises 30 parts of the dye of the formula

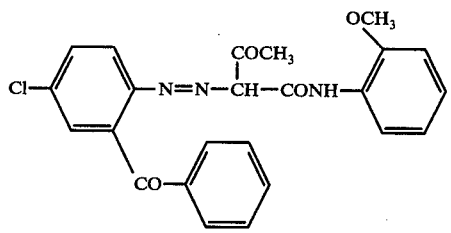

and 970 parts of a 10% strength alginate thickener. The print is dried at 105° C, treated for 7 minutes with live steam at 185° C and then finished by rinsing and soaping as described in Example 1. A fast yellow print on a white ground is obtained.

In the Examples which follow the dyes are used as described in Example 1. Dyeings in the stated hues are obtained.

Marketable formulations are obtained from the dyes referred to in the Examples by, for example, the following method:

30 parts of dye, 6 parts of dispersing agent, 10 parts of water retention agent, 1 part of disinfectant and about 53 parts of water are milled in a stirred ball mill until the particle size is about 0.5 μm. A dispersion having a good shelf life is thus obtained.

$$D-N=N-\underset{\underset{COCH_3}{|}}{CH}-CONH-R^1$$

| Example | D | R$^1$ | Hue |
|---|---|---|---|
| 7 | 2-CO$_2$CH$_3$-phenyl | C$_6$H$_5$ | yellow |
| 8 | " | 2-CH$_3$-4-Cl-5-OCH$_3$-phenyl | greenish yellow |
| 9 | " | 4-phenoxyphenyl | yellow |
| 10 | 3-CH$_3$-phenyl-N=N-2-CH$_3$-4-yl | 2-C$_2$H$_5$-phenyl | reddish yellow |
| 11 | 4-Cl-phenyl-N=N-(2,5-diOCH$_3$-4-CH$_3$)-phenyl | C$_6$H$_5$ | reddish yellow |
| 12 | phenyl-N=N-phenyl-4-yl | C$_6$H$_5$ | reddish yellow |
| 13 | " | 2,4-diCl-phenyl | yellow |
| 14 | " | 2-CH$_3$-5-[SO$_2$-N(C$_2$H$_5$)-C$_6$H$_5$]-phenyl | yellow |
| 15 | 2-CH$_3$-6-(H$_5$C$_6$CO)-phenyl | C$_6$H$_5$ | yellow |

-continued
$$D-N=N-\overset{\overset{\displaystyle COCH_3}{|}}{CH}-CONH-R^1$$
| Example | D | R¹ | Hue |
|---|---|---|---|
| 16 | " | 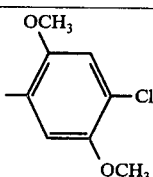 | yellow |
| 17 | " | 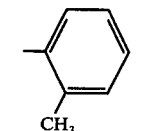 | yellow |
| 18 | " | 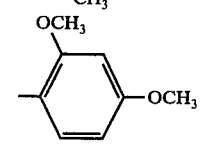 | yellow |
| 19 | 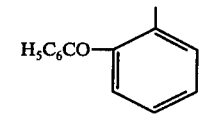 | 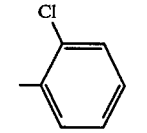 | yellow |
| 20 | " | 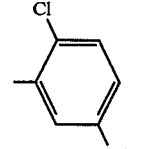 | yellow |
| 21 | 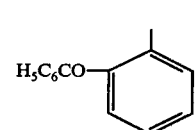 | C₆H₅ | greenish yellow |
| 22 | " | 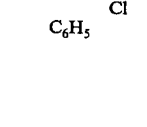 | greenish yellow |
| 23 | " | 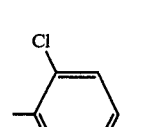 | greenish yellow |
| 24 | " | 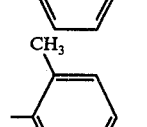 | greenish yellow |
| 25 | " | 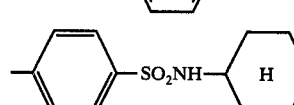 | yellow |
| 26 | " | 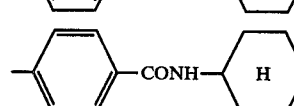 | yellow |
| 27 | " | 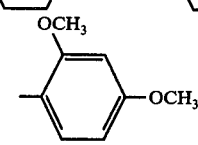 | yellow |

-continued $$D-N=N-\underset{\underset{COCH_3}{|}}{CH}-CONH-R^1$$

| Example | D | R¹ | Hue |
|---|---|---|---|
| 28 | " | 2,5-dimethylphenyl | yellow |
| 29 | " | 2,5-dimethoxy-4-chlorophenyl (with CH₃) | yellow |
| 30 | " | 3-hydroxyphenyl | yellow |
| 31 | " | 4-[CONH(CH₂)₃OC₂H₄OC₆H₅]phenyl | yellow |
| 32 | " | 4-[SO₂N(C₂H₅)(C₆H₅)]phenyl | yellow |
| 33 | " | 4-[SO₂NH(CH₂)₃OC₂H₄OC₆H₅]phenyl | yellow |
| 34 | " | 4-(4-chlorophenoxy)phenyl | yellow |

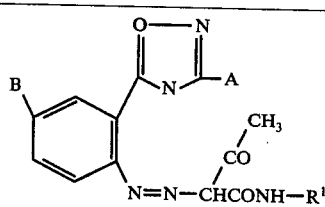

| Example | A | B | R¹ | Hue |
|---|---|---|---|---|
| 35 | Cl | H | 2,4-dimethoxyphenyl | yellow |
| 36 | " | " | 2-methylphenyl | yellow |
| 37 | " | " | 2-chlorophenyl | yellow |
| 38 | " | " | 4-(SO₂NH—C₆H₅)phenyl | yellow |
| 39 | " | " | 4-(CONHC₆H₅)phenyl | yellow |
| 40 | " | " | 2,5-dimethylphenyl | yellow |

-continued

| Example | A | B | R¹ | Hue |
|---|---|---|---|---|
| 41 | " | " | 4-OC₆H₅-phenyl | yellow |
| 42 | " | " | 4-(4-chlorophenoxy)phenyl | yellow |
| 43 | " | " | 2,4-dimethoxy-5-chlorophenyl | yellow |
| 44 | CH₃ | " | 2,4-dimethoxy-5-chlorophenyl | yellow |
| 45 | " | " | 2-methyl-4-chlorophenyl | yellow |

-continued

Structure:
$$\text{B-}\underset{\underset{\text{N=N-CHCONH-R}^1}{|}}{\overset{\overset{\text{O-N}}{\diagdown\diagup}}{\text{C}}}\text{-A with COCH}_3$$

(5-aryl-1,2,4-oxadiazole with phenyl bearing B and N=N-CH(COCH$_3$)CONH-R$^1$)

| Example | A | B | R¹ | Hue |
|---------|---|---|-----|-----|
| 46 | " | " | 2,4-dimethylphenyl (CH₃, CH₃) | yellow |
| 47 | C₆H₅ | Cl | 2,5-diethoxy-methylphenyl (OC₂H₅, OC₂H₅, CH₃) | yellow |
| 48 | C₆H₅ | Cl | 2,4,5-trimethylphenyl (CH₃, CH₃, CH₃) | yellow |
| 49 | " | " | 4-phenoxyphenyl (OC₆H₅) | yellow |
| 50 | " | " | 4-(cyclohexylsulfamoyl)phenyl (SO₂NH-C₆H₁₁) | yellow |
| 51 | " | " | 4-carbamoylphenyl (CONH₂) | yellow |
| 52 | " | " | 2-(methoxycarbonyl)phenyl (COOCH₃) | yellow |
| 53 | 2-CH₃-C₆H₄ | Cl | 2,4-dimethoxy-methylphenyl (OCH₃, OCH₃, CH₃) | yellow |
| 54 | " | " | 4-chloro-2,5-dimethoxyphenyl (OCH₃, OCH₃, Cl) | yellow |
| 55 | " | " | 5-chloro-2,4-dimethoxy-methylphenyl (OCH₃, OCH₃, Cl, CH₃) | yellow |

| Example | A | B | R¹ | Hue |
|---------|---|---|-----|-----|
| 56 | " | " | 2,4-dimethylphenyl (CH₃, CH₃) | yellow |
| 57 | " | " | 2,4-dichloro-methylphenyl (Cl, Cl, CH₃) | yellow |
| 58 | " | " | 2-methylphenyl (CH₃) | yellow |
| 59 | 4-Cl-C₆H₄ | H | 2,4-dimethoxy-methylphenyl (OCH₃, OCH₃, CH₃) | yellow |
| 60 | 4-Cl-C₆H₄ | H | 2,4,5-trimethylphenyl (CH₃, CH₃, CH₃) | yellow |
| 61 | " | " | 2,4-dimethyl-chlorophenyl (Cl, CH₃, CH₃) | yellow |
| 62 | " | " | 2,4-dichloro-methylphenyl (Cl, Cl, CH₃) | yellow |
| 63 | 4-CH₃-C₆H₄ | " | 2,4-diethoxy-methylphenyl (OC₂H₅, OC₂H₅, CH₃) | yellow |
| 64 | " | Cl | " | yellow |
| 65 | " | " | 2,4-dimethoxy-methylphenyl (OCH₃, OCH₃, CH₃) | yellow |

$$\text{D-N=N-}\underset{\underset{\text{CONH-R}^1}{|}}{\overset{\overset{\text{COCH}_3}{|}}{\text{CH}}}$$

| Example | D | R¹ | Hue |
|---------|---|-----|-----|
| 66 | 1-methylanthraquinon-2-yl | 4-chlorophenyl | yellow |
| 67 | " | 4-phenoxy-methylphenyl | yellow |
| 68 | " | 2-ethyl-methylphenyl (C₂H₅) | yellow |

-continued $$D-N=N-\underset{\underset{COCH_3}{|}}{CH}-CONH-R^1$$

| Example | D | R¹ | Hue |
|---|---|---|---|
| 69 | " | 2-methylphenyl | yellow |
| 70 | " | 2-(CO₂CH₃)phenyl | yellow |
| 71 | 1-methyl-2-methyl-anthraquinone | 2-methoxyphenyl | reddish yellow |
| 72 | " | 2-OCH₃, 4-OCH₃ phenyl | reddish yellow |
| 73 | " | 2-chlorophenyl | reddish yellow |
| 74 | 2-methyl-3-bromo-anthraquinone | 2-methylphenyl | reddish-yellow |
| 75 | " | C₆H₅ | reddish yellow |
| 76 | " | 2,4-dichlorophenyl | reddish yellow |
| 77 | 1-methyl-3-chloro-anthraquinone | C₆H₅ | reddish yellow |
| 78 | " | 2-OCH₃, 4-OCH₃ phenyl | reddish yellow |
| 79 | " | 4-OC₆H₅ phenyl | reddish yellow |
| 80 | 2-methyl-nitrobenzene | 2-methylphenyl | yellow |

-continued $$D-N=N-\underset{\underset{CONH-R^1}{|}}{\overset{\overset{COCH_3}{|}}{CH}}$$

| Example | D | R¹ | Hue |
|---|---|---|---|
| 81 | " | 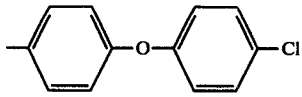 4-(4-chlorophenoxy)phenyl | yellow |
| 82 | " | 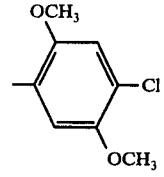 2,5-dimethoxy-4-chlorophenyl | golden yellow |
| 83 | 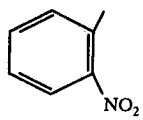 2-nitrotolyl | 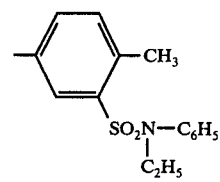 2-methyl-5-(N-ethyl-N-phenylsulfamoyl)phenyl | greenish yellow |
| 84 | " | 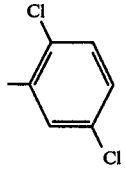 2,4-dichlorophenyl | yellow |
| 85 | " | 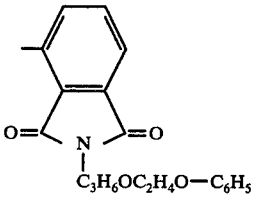 N-(phenoxyethoxypropyl)phthalimide | yellow |
| 86 | 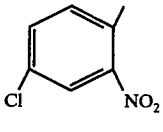 4-chloro-2-nitrotolyl | 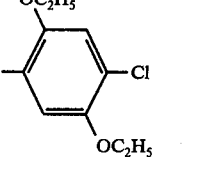 2,5-diethoxy-4-chlorophenyl | golden yellow |
| 87 | 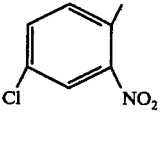 4-chloro-2-nitrotolyl | 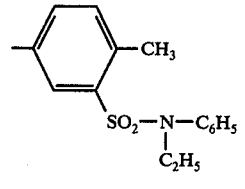 2-methyl-5-(N-ethyl-N-phenylsulfamoyl)phenyl | greenish yellow |
| 88 | " |  CONHC₃H₆OC₂H₄O—C₆H₅ | yellow |
| 89 | " | 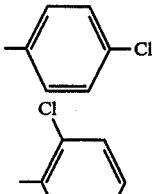 4-chlorophenyl | yellow |
| 90 | " |  2,4-dichlorophenyl | yellow |

-continued
$$D-N=N-\underset{\underset{COCH_3}{|}}{CH}-CONH-R^1$$
| Example | D | R¹ | Hue |
|---|---|---|---|
| 91 | " | 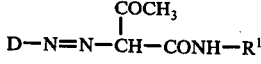 | yellow |
| 92 | " | 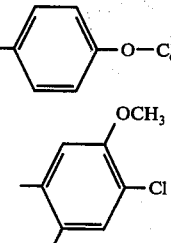 | yellow |
| 93 | " | 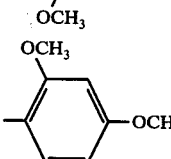 | yellow |
| 94 | " | 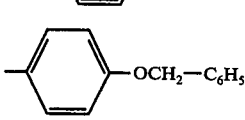 | yellow |
| 95 | 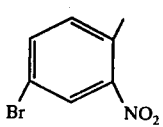 | 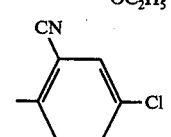 | golden yellow |
| 96 | " | 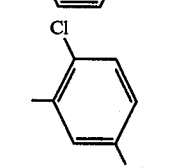 | yellow |
| 97 | " | 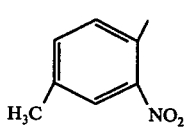 | yellow |
| 98 | 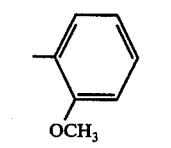 | 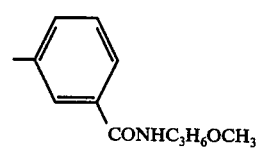 | yellow |
| 99 | " | 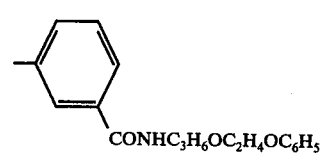 | yellow |
| 100 | " |  | yellow |
| 101 | " |  | yellow |

-continued $$D-N=N-\underset{\underset{CONH-R^1}{|}}{\overset{\overset{COCH_3}{|}}{CH}}$$

| Example | D | R[1] | Hue |
|---|---|---|---|
| 102 | 4-methoxy-2-nitro-methylphenyl (CH₃O, CH₃, NO₂ substituted phenyl) | 2,4-dichlorophenyl | yellow |
| 103 | methyl-benzanthrone | 2-methylphenyl | orange |
| 104 | " | C₆H₅ | orange |
| 105 | " | 2,4-dimethoxyphenyl | orange |
| 106 | N-methyl-naphthalimide (4-methyl) | 2,4-dichlorophenyl | reddish yellow |
| 107 | " | 2-methylphenyl | reddish yellow |
| 108 | " | C₆H₅ | reddish yellow |
| 109 | N-(C₃H₆OCH₃)-naphthalimide (4-methyl) | 2,4-dimethoxyphenyl | reddish yellow |
| 110 | " | 2-(SO₂—C₆H₅)phenyl | yellow |
| 111 | " | 2,4-dichlorophenyl | yellow |
| 112 | " | 4-(SO₂NHC₃H₆OC₂H₄OC₆H₅)-methylphenyl | yellow |

-continued
$$D-N=N-\underset{\underset{COCH_3}{|}}{CH}-CONH-R^1$$
| Example | D | R¹ | Hue |
|---|---|---|---|
| 113 | 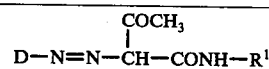 | C₆H₅ | reddish yellow |
| 114 | " | 4-Cl-2,5-di(OCH₃)-C₆H₂ | reddish yellow |
| 115 | N-(p-tolyl)-3-methylphthalimide | 2-Cl-C₆H₄ | yellow |
| 116 | " | 2-(C₆H₅SO₂)-C₆H₄ | yellow |
| 117 | " | 2,4-di(OCH₃)-C₆H₃ | yellow |
| 118 | N-phenyl-3-methylphthalimide | 2-OCH₃-C₆H₄ | yellow |
| 119 | " | 2-Cl-C₆H₄ | yellow |
| 120 | " | 4-Cl-2,5-di(OCH₃)-C₆H₂ | yellow |
| 121 | H₅C₆—OC₂H₄OC₃H₆NHCO—C₆H₄—NH₂ | C₆H₅ | yellow |
| 122 | " | 2,4-di(OCH₃)-C₆H₃ | yellow |

-continued $$D-N=N-\overset{\overset{\displaystyle COCH_3}{|}}{CH}-CONH-R^1$$

| Example | D | R¹ | Hue |
|---|---|---|---|
| 123 | " | 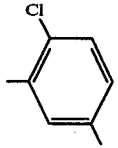 | yellow |
| 124 | 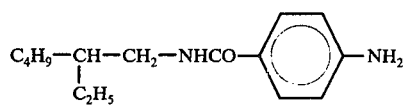 | 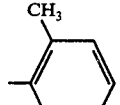 | yellow |
| 125 | " | 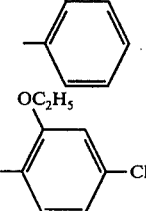 | yellow |
| 126 | " | 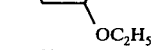 | yellow |
| 127 | 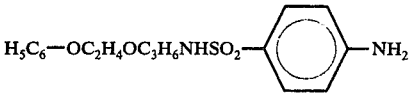 | 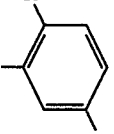 | yellow |
| 128 | " | 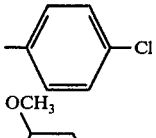 | yellow |
| 129 | 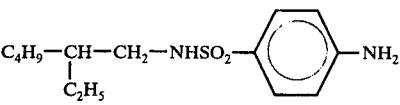 | 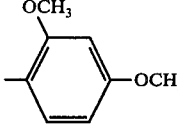 | yellow |
| 130 | " | 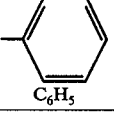 | yellow |
| 131 | " | C₆H₅ | yellow |

We claim:
1. Uniformly dyed water-swellable cellulosic fibers, said fibers being fast to washing, dry cleaning, sublimation and light and being produced by contacting water-swellable cellulosic fibers successively or simultaneously with water, ethylene glycol or a derivative of ethylene glycol and, while the fibers are still swollen, with an essentially water-insoluble dye of the formula

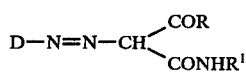

in which D is phenyl substituted by fluorine, chlorine, bromine, methyl, trifluoromethyl, ethyl, methoxy, ethoxy, phenoxy, nitro, cyano, methylsulfonyl, ethylsulfonyl, phenylsulfonyl, alkoxycarbonyl or 1 to 8 carbon atoms acetylamino, benzoyl, carbamoyl or sulfamoyl which are N-substituted by alkyl of 1 to 8 carbon atoms, by phenyl of by phenyl which is substituted by chlorine, methyl or methoxy, oxdiazol-5-yl, 3-phenyloxdiazol-5-yl, 4-phenyloxdiazol-2-yl, phenylazo, phenylazo substituted by chlorine, bromine, nitro, methyl, ethyl, methoxy or ethoxy, CONH(CH₂)₃OC₂H₄OT¹ or SO₂NH(CH₂)₃OC₂H₄OT¹;

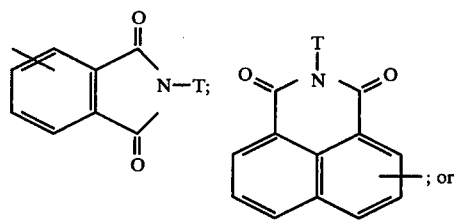

-continued

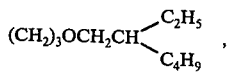

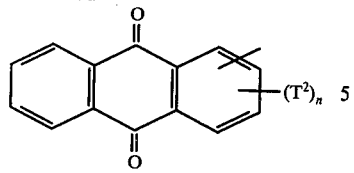

where *n* is 0 or 1, T is $C_6H_5$, $C_2H_4C_6H_5$, $(CH_2)_3OC_2H_4OC_6H_5$ or $(CH_2)_3OCH_2CH\begin{subarray}{l}C_2H_5\\C_4H_9\end{subarray}$, $T^1$ is alkyl of 1 to 8 carbon atoms, benzyl, phenylethyl, cyclohexyl, phenyl or tolyl, $T^2$ is methyl, chlorine or bromine, R is alkyl of 1 to 4 carbon atoms, phenyl or phenyl substituted by chlorine, bromine, methyl, methoxy or ethoxy, and $R^1$ is phenyl, or phenyl substituted by chlorine, bromine, methyl, ethyl, methoxy, ethoxy, benzyloxy, phenoxy, chlorophenoxy, alkoxycarbonyl (where alkoxy is of 1 to 8 carbon atoms), cyano, phenylsulfonyl, $CONHT^3$ or $SO_2NHT^3$, or

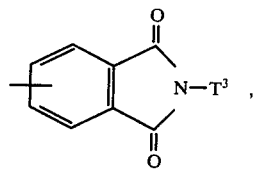

where $T^3$ is alkyl of 1 to 8 carbon atoms, cyclohexyl, benzyl, phenylethyl, phenyl, phenyl substituted by chlorine, methyl, methoxy or ethoxy, or $(CH_2)_3OC_2H_4OT^1$.

2. The fibers as claimed in claim 1 where R in the formula is methyl.

3. The fibers as claimed in claim 1 where D is phenyl substituted by chlorine, bromine, methyl, methoxy, nitro, phenylsulfonyl, methoxycarbonyl, benzoyl, $CONHT^3$, $SO_2NHT^3$, oxdiazol-5-yl or phenyloxdiazol-5-yl; or

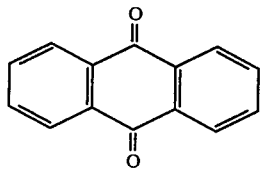

4. The fibers as claimed in claim 1 where $R^1$ is phenyl, phenyl substituted by chlorine, bromine, methyl, methoxy, ethoxy, phenoxy, cyano, phenylsulfonyl, $CONHT^3$ or $SO_2NHT^3$.

5. The fibers as claimed in claim 1 where $T^1$ is phenyl or tolyl.

6. The fibers as claimed in claim 1 where $T^3$ is phenylethyl, phenyl, phenyl substituted by chlorine, methyl, methoxy or ethoxy; or $(CH_2)_3OC_2H_4OT^1$.

7. The fibers as claimed in claim 1 where the dye has the formula

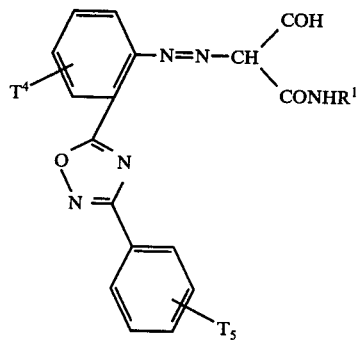

in which $T^4$ is hydrogen, chlorine, bromine or nitro, $T^5$ is hydrogen, chlorine, bromine or methyl and R and $R^1$ have the meanings given in claim 1.

8. The fibers as claimed in claim 1 where the dye has the formula

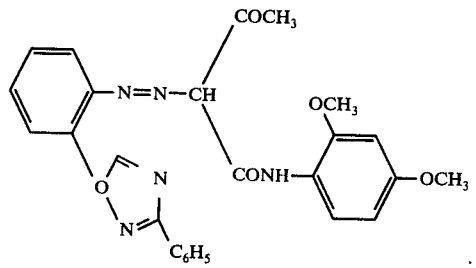

9. The fibers as claimed in claim 1 where the dye has the formula

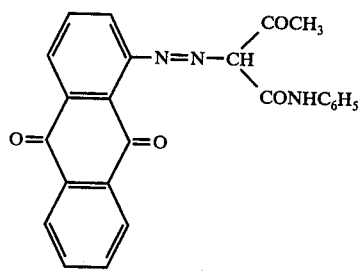

10. The fibers as claimed in claim 1 where the dye has the formula

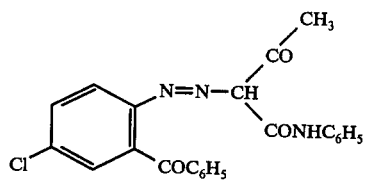

11. The fibers as claimed in claim 1, wherein the fibers are cotton fibers.

12. The fibers as claimed in claim 1, admixed or blended with synthetic fibers.

13. The fibers as claimed in claim 12, the synthetic fibers being polyester fibers.

* * * * *

UNITED STATES PATENT AND TRADEMARK OFFICE
CERTIFICATE OF CORRECTION

PATENT NO. : 4,083,686
DATED : April 11, 1978
INVENTOR(S) : Dimroth et al

It is certified that error appears in the above-identified patent and that said Letters Patent are hereby corrected as shown below:

In column 28, first line (excluding the formulas): change "phenyl of by phenyl" to read --phenyl or by phenyl--.

In column 30, in the first formula: change "COH" to --COR--.

Signed and Sealed this

Thirty-first Day of October 1978

[SEAL]

Attest:

RUTH C. MASON
Attesting Officer

DONALD W. BANNER
Commissioner of Patents and Trademarks